US010711115B2

(12) United States Patent
Lake, Jr. et al.

(10) Patent No.: US 10,711,115 B2
(45) Date of Patent: *Jul. 14, 2020

(54) PROCESS FOR EXTRUDING POLYPROPYLENE

(71) Applicant: Milliken & Company, Spartanburg, SC (US)

(72) Inventors: Kemper D. Lake, Jr., Spartanburg, SC (US); Christopher T. Kochanowicz, Spartanburg, SC (US); Joseph J. Peterson, Simpsonville, SC (US); Clifford S. Bynum, Inman, SC (US); Keith A. Keller, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/988,441

(22) Filed: May 24, 2018

(65) Prior Publication Data
US 2018/0265670 A1 Sep. 20, 2018

Related U.S. Application Data

(63) Continuation of application No. 14/931,090, filed on Nov. 3, 2015, now Pat. No. 9,994,692.

(60) Provisional application No. 62/084,125, filed on Nov. 25, 2014.

(51) Int. Cl.
C08K 5/098 (2006.01)
C08K 5/18 (2006.01)
B32B 27/18 (2006.01)
C08L 23/12 (2006.01)
C08J 5/18 (2006.01)
C08K 5/00 (2006.01)

(52) U.S. Cl.
CPC .............. C08K 5/098 (2013.01); B32B 27/18 (2013.01); C08J 5/18 (2013.01); C08K 5/0083 (2013.01); C08L 23/12 (2013.01); B32B 2307/518 (2013.01); C08J 2323/10 (2013.01); C08J 2323/12 (2013.01)

(58) Field of Classification Search
CPC ....................................................... C08L 23/10
See application file for complete search history.

(56) References Cited

U.S. PATENT DOCUMENTS

| 5,236,514 A * | 8/1993 | Leung ...................... C11D 3/14 |
| | | 134/22.14 |
| 6,458,873 B1 | 10/2002 | DePorter ....................... 524/108 |
| 6,465,551 B1 | 10/2002 | Zhao et al. ................... 524/284 |
| 6,562,890 B2 | 5/2003 | Dotson ......................... 524/396 |

(Continued)

FOREIGN PATENT DOCUMENTS

| JP | 2007-63484 | 3/2007 | |
| WO | WO 2007/044122 | 4/2007 | |
| WO | WO-2010104628 A1 * | 9/2010 | ................ C08J 5/18 |

OTHER PUBLICATIONS

Patent Cooperation Treaty PCT International Search Report, dated Feb. 15, 2016, International Application No. PCT/US2015/059404, International Filing Date, Nov. 6, 2015.

Primary Examiner — Stephen E Rieth
(74) Attorney, Agent, or Firm — Cheryl J. Brickey

(57) ABSTRACT

A process for extruding polypropylene comprising extruding a composition comprising a polypropylene and a second acid scavenger and less than about 10 ppm of a nucleating agent.

20 Claims, 1 Drawing Sheet

(56) References Cited

U.S. PATENT DOCUMENTS

| | | | |
|---|---|---|---|
| 6,599,971 B2 | 7/2003 | Dotson et al. | 524/394 |
| 6,734,270 B1 | 5/2004 | Minami et al. | 526/351 |
| 6,770,355 B1 | 8/2004 | Minami et al. | 428/220 |
| 7,786,203 B2 | 8/2010 | Hanssen et al. | 524/394 |
| 8,114,932 B2 | 2/2012 | McLeod | 524/285 |
| 9,994,692 B2 * | 6/2018 | Lake, Jr. | B32B 27/18 |
| 9,994,695 B2 * | 6/2018 | Lake, Jr. | C08J 5/18 |
| 2003/0008956 A1 | 1/2003 | Zhao et al. | 524/285 |
| 2003/0073764 A1 | 4/2003 | Zhao | 524/108 |
| 2005/0197435 A1 * | 9/2005 | Dotson | C08K 5/0083 524/394 |
| 2005/0233656 A1 * | 10/2005 | Royer | D02G 3/447 442/2 |
| 2007/0080485 A1 | 4/2007 | Kerscher et al. | 264/564 |
| 2007/0172613 A1 * | 7/2007 | Jacoby | C08L 23/10 428/35.7 |
| 2010/0317779 A1 | 12/2010 | Pham et al. | 524/141 |
| 2011/0092625 A1 | 4/2011 | Xu et al. | 524/160 |
| 2014/0107270 A1 | 4/2014 | Fellahi | 524/291 |

* cited by examiner

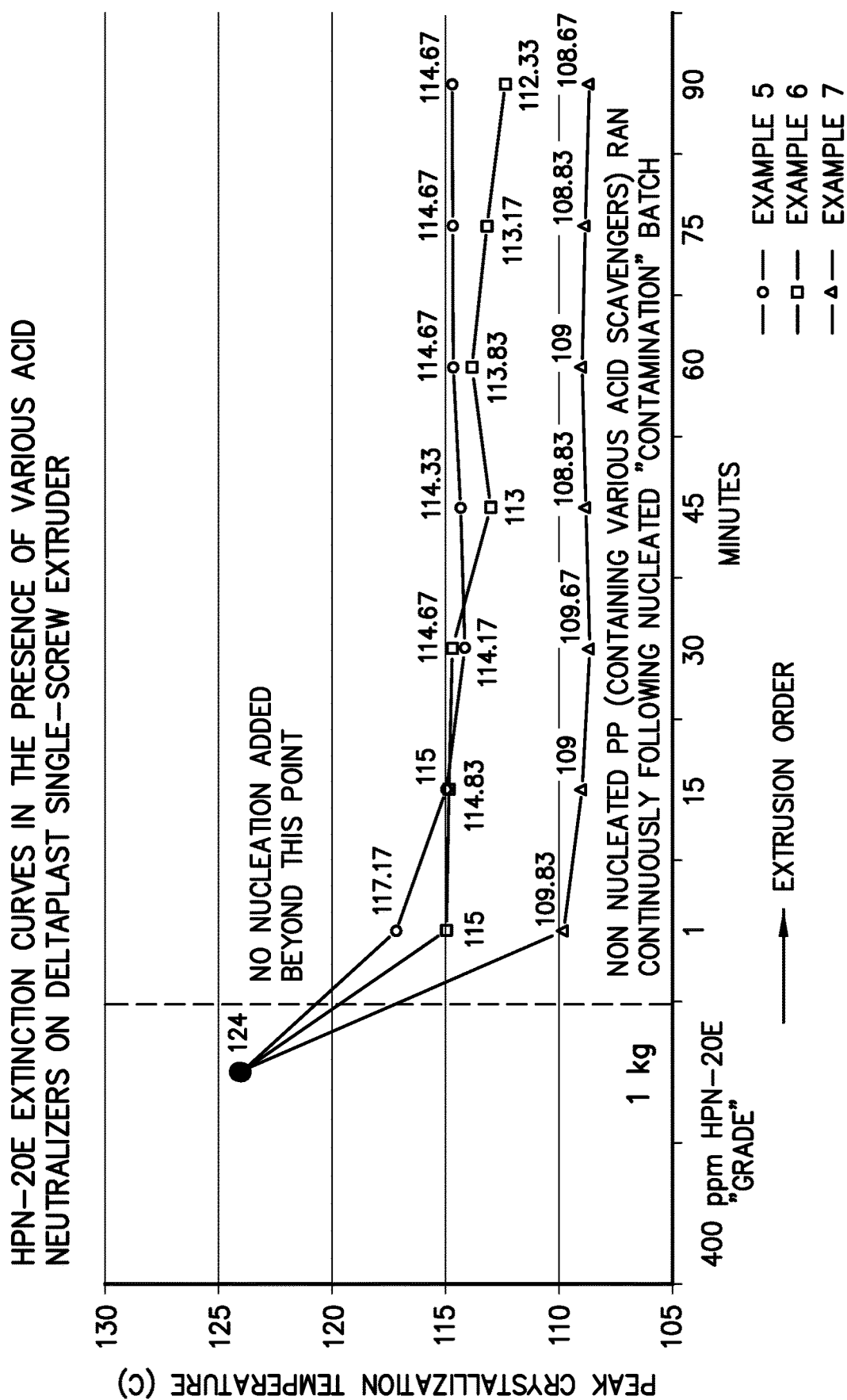

PROCESS FOR EXTRUDING POLYPROPYLENE

RELATED APPLICATIONS

This application is a continuation of co-pending U.S. application Ser. No. 14/931,090 filed Nov. 3, 2015, which claims priority to U.S. provisional application 62/084,125 filed Nov. 25, 2014, both of which are incorporated herein in their entirety.

TECHNICAL FIELD OF THE INVENTION

The present invention is directed to the process of extruding polypropylene compositions with acid scavengers and low levels of nucleating agents.

BACKGROUND

There are some non-nucleated polypropylene (PP) grades, for example biaxially oriented polyproplylene (BOPP), where a consistent base-line crystallization temperature is required. In BOPP, changes in crystallization rates may affect several processing variables—the point in the process where the film is quenched (or freezes), the temperature at which the film is successfully oriented, and the amount of orientation that can be achieved under standard processing conditions. If a BOPP film becomes inadvertently nucleated, it is well known in the industry that processing problems may be encountered—chief among these is for the film to tear or split in the machine direction as it is being oriented transversally.

Likewise if an injection molding polypropylene grade becomes inadvertently nucleated, it is possible that the shrinkage characteristics may be altered. Therefore, an injection molded article having demanding dimensional tolerances may shrink too much and fall out of specification if made with the inadvertently nucleated composition.

Similar processing problems and/or physical property problems may exist with a wide variety of part fabrications when the incoming polypropylene becomes inadvertently nucleated if the part fabrication was initially established with non-nucleated polypropylene.

A need therefore exists for additives and processes that can reduce or eliminate any residual nucleation in non-nucleated polypropylene grades.

BRIEF SUMMARY OF THE INVENTION

A process for extruding polypropylene containing extruding a first composition forming a first extrudate then a second composition forming a second extrudate. The first composition contains a first polypropylene, a nucleating agent, and a first acid scavenger, where the nucleating agent is in an amount of at least about 50 ppm. The second composition contains a second polypropylene and a second acid scavenger and where the second extrudate contains less than about 10 ppm of a nucleating agent.

BRIEF DESCRIPTION OF THE DRAWINGS

FIG. 1 illustrates a graph showing the $T_c$ of the formulation of Examples 5, 6, and 7 versus time.

DETAILED DESCRIPTION

The following definitions are provided to define several of the terms used throughout this application.

When the term "stearate" is used in the application, the term is used to include mono, di, and tri stearates depending on the metal cation and its valency. Additionally, when a compound is designated a "stearate", the compound may also contain low amounts of other fatty acids such as palmitate, myristate, etc which are characteristic of commercial grades of stearates. The term "fatty acids" may also include chemical derivatives such as (but not limited to) 12-hydroxy stearates, lactylates, and lactate esters.

As used herein, the term "acid neutralizer" or "acid scavenger" refers to those classes of additives which may be used to neutralize acidic species related to or created by residual amounts of catalyst used in the polymerization reaction in polypropylene manufacturing. These neutralizers or scavengers may also serve other purposes as well in the formulation such as color improvement, lubricity, or as a mold release agent.

Unless otherwise indicated, conditions are 25° C., 1 atmosphere of pressure and 50% relative humidity, concentrations are by weight, and molecular weight is based on weight average molecular weight. The term "polymer" as used in the present application denotes a material having a weight average molecular weight ($M_w$) of at least 5,000. The term "copolymer" is used in its broad sense to include polymers containing two or more different monomer units, such as terpolymers, and unless otherwise indicated, includes random, block, and impact copolymers. The concentration of ethylene or propylene in a particular phase or in the heterophasic composition is based on the weight of reacted ethylene units or propylene units relative to the total weight of polyolefin polymer in the phase or heterophasic composition, respectively, excluding any fillers or other non-polyolefin additives. The concentration of each phase in the overall heterogeneous polymer composition is based on the total weight of polyolefin polymers in the heterophasic composition, excluding any fillers or other non-polyolefin additives or polymers.

The process preferably begins with extruding a first composition forming a first extrudate, wherein the first composition comprises a first polypropylene, a nucleating agent, and a first acid scavenger. The first composition is defined as the composition entering the extruder and the first extrudate is defined as the composition exiting the extrusion die. The first composition contains a nucleating agent in an amount of at least about 50 ppm and the nucleating agent is selected from the group consisting of phosphate ester salts, sodium benzoate, lithium benzoate, bis(4-tert-butyl-benzoate) aluminum hydroxide (also known commercially as Al-PTBBA), talc, and compounds conforming to the structure of Formula (I) or Formula (II) illustrated below.

The first extrudate of the invention is useful in producing thermoplastic articles. The first extrudate may be used to create a finished good or resin that may be used in a secondary operation. The first extrudate can be formed into the desired thermoplastic article by any suitable technique, such as injection molding, blow molding (e.g., injection blow molding or injection stretch blow molding), extrusion, extrusion blow molding, thermoforming, rotomolding, film blowing (blown film), film casting (cast film), compression molding and the like. The first extrudate may be biaxially oriented to form a BOPP film (biaxially oriented polypropylene), extruded into a fiber, or extruded into a pipe and may also be used as an intermediate resin (pelletized or powdered) that is then feed into another process to create a finished good.

The first extrudate is preferably purposefully nucleated polypropylene, meaning that the nucleating agent is intentionally added to the first composition in an amount great enough to significantly nucleate the first polypropylene. As such, the temperature of crystallization ($T_c$) will be higher than for the PP in the absence of a nucleating agent. Additionally, the crystalline morphology of the polymer may differ in orientation as dictated by the epitaxial match between the polymer and the unique nucleating substrate. Intentional loadings of commercially available nucleating agents may increase the crystallization temperature of the polymer between 15 and 30° C.

Nucleated polypropylene is highly desired in many markets because of the attributes it brings to the processor and/or end-user. The higher crystallization temperature associated with nucleated polypropylene generally translates into faster processing speeds since parts solidify faster and at a higher temperature. The reduction in crystal size that is caused by the nucleating agent also may translate into greater transparency and gloss. With regard to physical properties, nucleated polypropylene generally has higher modulus, greater temperature resistance, and unique shrinkage properties that are dependent upon the type of nucleating agent which is being incorporated. In addition, tensile strength may be improved but this may come with a decrease in tensile elongation. While these types of properties are generally desirable, these attributes can be problematic in situations where these attributes are not desired and where needed accommodations to the process cannot be readily made to suit variability in the degree of nucleation present in the incoming polypropylene composition.

The first polypropylene may be any suitable polypropylene including polypropylene homopolymers, polypropylene copolymers (polypropylene block copolymers (e.g., impact copolymer), polypropylene random copolymers and mini random copolymers), and mixtures thereof. The copolymers may contain co-monomers of ethylene, butene, or pentene.

The first composition comprises the nucleating agent in an amount of at least about 50 ppm of the nucleating agent, more preferably at least about 100 ppm. In another embodiment, the first composition comprises the nucleating agent in an amount of at least about 300 ppm of the nucleating agent, more preferably at least about 500 ppm. In another embodiment, the first composition comprises the nucleating agent in an amount of at least about 1,000 ppm of the nucleating agent, more preferably at least about 2,000 ppm.

In one embodiment, the nucleating agent is a cycloaliphatic metal salt. In one embodiment, the nucleating agent comprises specific metal salts of hexahydrophthalic acid (and will be referred to herein as HHPA). In this embodiment, the nucleating agent conforms to the structure of Formula (I):

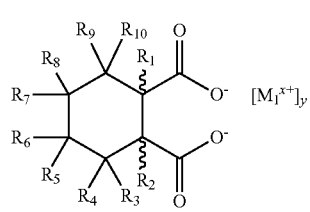

(I)

$R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl. $M_1$ is a metal or organic cation, x is an integer from 1 to 2, and y is an integer from 1 to 2. Preferably, $M_1$ is selected from the group of calcium, strontium, lithium, and monobasic aluminum.

In one preferred embodiment, $M_1$ is a calcium cation and R1-R10 are hydrogen. Ca HHPA as referred to herein refers to Formula (IA). One may employ HYPERFORM™ HPN-20E from Milliken & Company of Spartanburg, S.C. which is commercially sold, and comprises Ca HHPA and is described for example in U.S. Pat. No. 6,599,971 which is hereby incorporated by reference in its entirety.

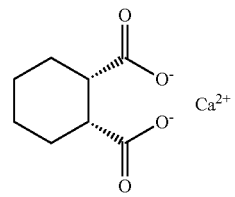

(IA)

In another embodiment, the nucleating agent is a bicyclic dicarboxylate metal salt described, for example, in U.S. Pat. Nos. 6,465,551 and 6,534,574. The nucleating agent conforms to the structure of Formula (II):

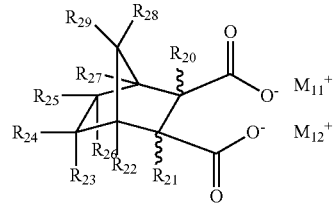

(II)

where $M_{11}$ and $M_{12}$ are the same or different, or $M_{11}$ and $M_{12}$ are combined to form a single moiety, and are independently selected from the group consisting of metal or organic cations. Preferably, $M_{11}$ and $M_{12}$ (or the single moiety from the combined $M_{11}$ and $M_{12}$) are selected from the group consisting of: sodium, calcium, strontium, lithium, zinc, magnesium, and monobasic aluminum. Wherein $R_{20}$, $R_{21}$, $R_{22}$, $R_{23}$, $R_{24}$, $R_{25}$, $R_{26}$, $R_{27}$, $R_{28}$, and $R_{29}$ are independently selected from the group consisting of: hydrogen and $C_1$-$C_9$ alkyls; and further wherein any two adjacently positioned $R_{22}$-$R_{29}$ alkyl groups optionally may be combined to form a carbocyclic ring. Preferably, $R_{20}$-$R_{29}$ are hydrogen and $M_{11}$ and $M_{12}$ are a sodium cations.

In particular, suitable bicyclic dicarboxylate metal salts include disodium bicyclo [2.2.1] heptane-2,3-dicarboxylate, calcium bicyclo [2.2.1] heptane-2,3-dicarboxylate, and combinations thereof. One may employ HYPERFORM™ HPN-68 or HPN-68L from Milliken & Company of Spartanburg, S.C. HPN-68L is commercially sold, and comprises the disodium bicyclo [2.2.1] heptane-2,3-dicarboxylate shown in Formula (IIA).

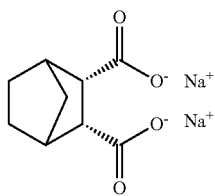

IIA

In another embodiment, the nucleating agent is a phosphate ester salt. Phosphate ester salts suitable for use as the nucleating and/or clarifying agent include, but are not limited to, sodium 2,2'-methylene-bis-(4,6-di-tert-butylphenyl) phosphate (from Asahi Denka Kogyo K. K., known as "NA-11™") aluminum hydroxy bis[2,2'-methylene-bis-(4,6-di-tert-butylphenyl)phosphate] and lithium myristate (from Asahi Denka Kogyo K. K., known as "NA-21™"), and other such phosphate esters such as NA-71 (lithium phosphate salt and lithium stearate) as disclosed for example in U.S. Pat. Nos. 5,342,868 and 4,463,113.

In another embodiment, the nucleating agent is sodium benzoate. When the nucleating agent is sodium benzoate, the sodium benzoate may function as both the nucleating agent and the acid scavenger and thus a separate and additional acid scavenger may not need to be employed. In one embodiment where the nucleating agent is sodium benzoate, the acid scavenger is the same composition as the nucleating agent (sodium benzoate).

In another embodiment, the nucleating agent is lithium benzoate. In another embodiment, the nucleating agent is bis(4-tert-butyl-benzoate) aluminum hydroxide (also known commercially as Al-PTBBA). In another embodiment, the nucleating agent is talc (hydrated magnesium silicate).

In certain possibly preferred embodiments, the first composition comprises a first acid scavenger in addition to the first polypropylene and the nucleating agent. The acid scavengers suitable for use in the composition of the invention can be any suitable acid scavenger, including but not limited to, aluminum stearate, manganese stearate, calcium stearate, sodium stearate, lithium stearate, magnesium stearate, zinc stearate, cobalt stearate, cerium stearate, potassium stearate, copper stearate, ferric stearate, nickel stearate, calcium lactate, calcium stearoyl lactylate, synthetic hydrotalcites, zinc oxide, calcium oxide, magnesium oxide, and calcium hydroxide. Preferably, the first acid scavenger is selected from the group consisting of metal salts of stearic acid, such as calcium stearate, zinc stearate, magnesium stearate, and mixtures thereof. Calcium stearate may be preferred for some applications due to its low cost, low coloration, and good performance. In another embodiment, the first acid scavenger is hydrotalcite (i.e. DHT-4A) due to its efficacy and low migration characteristics. In one embodiment, the first acid scavenger is a blend of two or more acid scavengers.

When present in the composition, the first acid scavenger can be present in the first composition in any suitable amount. The level of acid scavenger (first and second) may be chosen based on the nature of the polymerization catalyst, the amount of residual catalyst, and/or the amount required to effectively stabilize the composition.

Preferably, the first acid scavenger is present in the composition in an amount of about 250 ppm to about 2500 ppm, based on the total weight of the first composition. The first acid scavenger is more preferably present in the composition in an amount of about 400 ppm to about 1500 ppm and most preferably about 500 ppm to about 1200 ppm, based on the total weight of the first composition.

Resin extruders will sometimes follow a nucleated polypropylene run with a non-nucleated polypropylene run. In the second step of the process, a second composition is extruded forming a second extrudate, wherein the second composition comprises a second polypropylene and a second acid scavenger, wherein the second extrudate contains less than about 10 ppm of a nucleating agent.

The second polypropylene may be any suitable polypropylene, including the polypropylene types disclosed as for the first polypropylene. The second polypropylene may be the same or different polypropylene than the first polypropylene.

In one embodiment, the second extrudate contains less than about 5 ppm of the nucleating agent, more preferably less than about 1 ppm. In another embodiment, the second extrudate contains less than about 0.1 ppm of the nucleating agent, more preferably less than about 0.01 ppm. In another embodiment, the second extrudate contains between about 0.01 ppm and 1 ppm of the nucleating agent.

Preferably, no additional nucleating agent is intentionally added to the second composition at any point during the preparation and extrusion of the second composition. The nucleating agent may be added inadvertently to the second composition through residual amounts of nucleating agent retained in the extrusion die/screw/barrel, hoppers, feeders, feed lines, additive masterbatch blenders, or any other part of the extrusion system. It has been found that extruded polypropylene containing residual, low levels of nucleating agent and certain acid scavengers can produce inadvertently nucleated polypropylene. This nucleation may be undesired and cause undesirable properties in the inadvertently nucleated polypropylene such as high crystallization temperatures (Tc) and difficulty producing BOPP films without tears.

In one embodiment, the content of all nucleating agents in the second extrudate is less than 10 ppm, more preferably less than 5 ppm, more preferably less than 1 ppm, more preferably less than 0.1 ppm, more preferably less than 0.01 ppm.

Preferably, the $T_c$ of the second extrudate is within approximately 5° C. of the $T_c$ of the second polypropylene uncontaminated baseline state. The method for determination of this baseline state for a given polypropylene is defined in the Test Methods section of the specification. In another embodiment, the $T_c$ of the second extrudate is within approximately 3° C. of the $T_c$ of the second polypropylene uncontaminated baseline state, more preferably within approximately 1.5° C. In another embodiment where the polypropylene comprises homopolymer polyproylene, the $T_c$ of the second extrudate is less than about 115° C., more preferably less than about 112° C., more preferably less than about 110° C.

Preferably, the difference between the Tc of the first extrudate and the second extrudate is greater than approximately 5° C., more preferably greater than approximately 10° C., even more preferably between approximately 15 and 20° C. and most preferably greater than approximately 25° C.

Without being bound to any single theory, it is hypothesized that the preferred second acid scavengers are thought to be de-activating the residual amounts of nucleator. This de-activation may be enabled through an ion-exchange mechanism between the residual nucleator and the acid neutralizer; thereby, changing the chemical nature of the nucleating species. This de-activation may also occur by the acid neutralizer coating the surface of the nucleator, thereby altering the epitaxial match between the nucleator and the polypropylene.

In one embodiment, the second acid scavenger is a potassium salt of a fatty acid. It has been found that the potassium salt of a fatty acid results in low nucleation of a polypropylene with all known nucleating agents described above and the like. Preferably, the second acid scavenger comprises a potassium cation and a $C_3$-$C_{22}$ fatty acid anion. More preferably, the second acid scavenger comprises potassium stearate. In one embodiment, the second acid scavenger is a blend of two or more acid scavengers.

In the embodiment where the nucleating agent is a composition corresponding to Formula (I), then the second acid scavenger is preferably a metal salt of a fatty acid, wherein the metal salt comprises a cation of a metal selected from the group consisting of lithium, sodium, potassium, and magnesium. In one embodiment, the second acid scavenger contains a potassium or sodium cation and a $C_3$-$C_{22}$ fatty acid anion. In one embodiment, the second acid scavenger contains a lithium or magnesium cation and a $C_3$-$C_{22}$ fatty acid anion. In a preferred embodiment, the second acid scavenger is potassium stearate. In another preferred embodiment, the second acid scavenger is sodium stearate. It has been found that potassium stearate and sodium stearate are able to prevent or significantly reduce any unwanted nucleation of polypropylene extrudates having low amounts of residual nucleating agents corresponding to Formula (I). In one embodiment, the second acid scavenger is a blend of two or more acid scavengers. In one embodiment, the second acid scavenger is selected from the group consisting of titanium dioxide, calcium silicate, and silica.

In the embodiment where the nucleating agent is a composition corresponding to Formula (II), then the second acid scavenger is selected from the group consisting metal stearoyl-2-lactylate, wollastonite ($CaSiO_3$), and magnesium oxysulfate, silica, and a metal salt of a fatty acid, wherein the metal salt comprises a cation of a metal selected from the group consisting of aluminum, manganese, zinc, potassium, and magnesium. In one embodiment, the second acid scavenger contains a potassium or aluminum cation and a $C_3$-$C_{22}$ fatty acid anion. In a preferred embodiment, the second acid scavenger is potassium stearate. In another preferred embodiment, the second acid scavenger is aluminum stearate. It has been found that potassium stearate and aluminum stearate are able to prevent or significantly reduce any unwanted nucleation of polypropylene extrudates having low amounts of residual nucleating agents corresponding to Formula (II). In another preferred embodiment, the second acid scavenger may be calcium stearoyl lactylate, zinc 12-hydroxy stearate or magnesium 12-hydroxy stearate. In one embodiment, the second acid scavenger is a blend of two or more acid scavengers.

In the embodiment where the nucleating agent is a phosphate ester salt, sodium benzoate, lithium benzoate, bis(4-tert-butyl-benzoate) aluminum hydroxide (commercially known as Al-ptbba), talc, then the second acid scavenger is preferably a metal salt of a fatty acid, wherein the metal salt comprises a cation of a metal is selected from the group consisting of sodium, aluminum, and potassium. In one embodiment, the second acid scavenger is a blend of two or more acid scavengers.

In one embodiment, the first acid scavenger and the second acid scavenger are the same composition. This may be preferred in manufacturing environments to lower costs and simplify raw material streams.

The process may be used to form polypropylene finished goods or resins having significantly reduced undesired nucleation due to residual amounts of nucleating agents. In one embodiment, the biaxially oriented polypropylene film may be produced. In this specification, biaxially oriented polypropylene film is defined to include oriented polymer films such as tentered or blown polypropylene films.

In one embodiment, the BOPP film comprises a nucleating agent, a potassium salt of a fatty acid and a thermoplastic essentially consisting of polypropylene. The content of all nucleating agents in the film is less than 10 ppm, and wherein the nucleating agent preferably conforms to the structure of Formula (I) or (II). The film may contain one or more layers and at least one of the layers contains a nucleating agent, a potassium salt of a fatty acid, and thermoplastic essentially consisting of polypropylene, wherein the content of all nucleating agents in the film is less than 10 ppm, and wherein the nucleating agent conforms to the structure of Formula (I) or (II). Preferably, all of the thermoplastic polymer within the film essentially consists of polypropylene. In this application, "essentially consisting of polypropylene" means that the polypropylene polymer contains less than 10% by weight of other thermoplastic polymers.

Test Methods

Peak Crystallization Temperature ($T_c$)—The peak crystallization temperature ($T_c$) for all examples was determined in accordance with ASTM D3418-08, modified with a profile of heating from 50° C. to 220° C. at a rate of 20° C./min, holding for 2 minutes, and cooling at a rate of 20° C./min back to 50° C. Under these conditions, the peak $T_c$ was then determined from the crystallization exotherm. Two instruments were involved in the measurement of samples—a Mettler Toledo DSC 822 and Mettler Toledo DSC 1 Star. The $T_c$ bias between the 2 instruments was approximately 1° C.

Baseline $T_c$—The baseline value of 107.5° C. was established by a) making a 0.5 kg batch consisting of PRO-FAX™ 6301 reactor flake, 500 ppm of IRGANOX™ 1010, 1000 ppm of IRGAFOS™ 168, and 500 ppm of calcium stearate, b) vigorously mixing the batch in a sterile plastic bag, c) molding the powder mixture into discs having a thickness of 1.27 mm with a Carver Press exerting a hydraulic pressure of 13,000 psi and a temperature of 230° C., d) obtaining specimens from these discs for differential scanning calorimetry, and e) determining the peak crystallization temperature (To) in accordance with ASTM D3418-08 (modified with a profile of heating from 50° C. to 220° C. at a rate of 20° C./min, holding for 2 minutes, and cooling at a rate of 20° C./min back to 50° C.) whereby the peak $T_c$ value was determined from the crystallization exotherm. In this manner, the $T_c$ was determined from the polymer having a standard additive package whereby the risk of introducing contaminants capable of nucleating the polymer could be essentially eliminated.

Example Set 1

Some polypropylene extrusion systems first extrude a polypropylene with a nucleating agent (in an amount greater than 50 ppm), then switch over to a non-nucleated grade polypropylene. The non-nucleated grade polypropylene may still contain residual amounts (1 ppm) of nucleating agent. This example simulates the non-nucleated grade polypropylene with residual amounts of nucleating agent and the effect of various acid scavengers on the $T_c$ of the polypropylene composition.

To create polypropylene compositions having low levels of nucleating agents, a concentrated nucleating agent mixture was first formed by adding the following ingredients to PRO-FAX™ 6301 12 MFR PP homopolymer reactor flake: IRGANOX™ 1010 in an amount of 500 ppm, IRGAFOS™ 168 in an amount of 1000 ppm, and HYPERFORM™ HPN-68L (abbreviated in this application as HPN-68L) available from MILLIKEN & COMPANY™ or HYPERFORM™ HPN-20E (abbreviated in this application as HPN-20E) available from MILLIKEN & COMPANY™ nucleator in an amount of 1000 ppm. Utilizing a 1 kg batch size, these ingredients were high intensity blended in a 10 liter HENSCHEL™ mixer for 1 minute forming the concentrated nucleating agent mixture.

Next, to a reactor flake of a polypropylene homopolymer used for manufacturing bi-axially oriented polypropylene film, the following ingredients were added: IRGANOX™1010 in an amount of 500 ppm, IRGAFOS™ 168 in an amount of 1000 ppm, and the concentrated nucleating agent mixture in an amount of 1000 ppm. This serial dilution resulted in approximately 1 ppm nucleating agent in the formulation. In addition, the acid scavenger to be screened was also added at a concentration consistent with its use in commercial formulations. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a Maddocks mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry.

TABLE 1

Nucleating agent loading, acid scavenger loading, and peak $T_c$ for Examples 1-4.

| | Nucleating Agent Loading | | Acid Scavenger Loading | | | Peak |
|---|---|---|---|---|---|---|
| | HPN-20E | HPN-68L | Potassium Stearate | Sodium Stearate | Aluminum Stearate | $T_c$ (° C.) |
| Example 1 | 1 ppm | — | 500 ppm | — | — | 105.8 |
| Example 2 | 1 ppm | — | — | 500 ppm | — | 109.2 |
| Example 3 | — | 1 ppm | 500 ppm | — | — | 107.5 |
| Example 4 | — | 1 ppm | — | — | 500 ppm | 106.3 |

The baseline $T_c$ of the polypropylene used for manufacturing bi-axially oriented film was 107.3° C. As can be seen from the results set forth in the Table 1, the $T_c$ of Examples 1-4 were within +/−2° C. of the BOPP grade polypropylene. These data illustrate that the harmful effects (i.e. $T_c$ values 5-10° C. over baseline) from residual amounts of HPN-20E and HPN-68L can be essentially eliminated through the selection of preferred acid scavengers. The baseline (for only Example Set 1) was not measured in the manner described in the Test Methods section. This baseline value of 107.3° C. was established by a) making a 0.1 kg batch consisting of the subject polypropylene reactor flake, 500 ppm of Irganox 1010, 1000 ppm of Irganox 1010, and 500 ppm of calcium stearate, b) vigorously mixing the batch in a sterile plastic bag, c) molding the powder mixture into discs having a thickness of 1.27 mm with a Carver Press exerting a hydraulic pressure of 13,000 psi and a temperature of 230° C., d) obtaining specimens from these discs for differential scanning calorimetry, and e) determining the peak crystallization temperature ($T_c$) in accordance with ASTM D3418-08 (modified with a profile of heating from 50° C. to 220° C. at a rate of 20° C./min, holding for 2 minutes, and cooling at a rate of 20° C./min back to 50° C.) whereby the peak $T_c$ value was determined from the crystallization exotherm. In this manner, the $T_c$ was determined from the polymer having a standard additive package whereby the risk of introducing contaminants capable of nucleating the polymer could be essentially eliminated.

Example Set 2

To illustrate how quickly a preferred acid neutralizer could diminish the unwanted effects from residual nucleation, an experiment was designed on a DELTAPLAST™ 25 mm single screw extruder (30:1 l/d) equipped with a MADDOCKS™ mixer (typical output of approximately 6 kg/hr). The barrel temperature profile was set with a maximum zone setting of approximately 230° C. The molten polymer was filtered through a 60 mesh screen pack and then extruded through a strand die. The strand was subsequently quenched in a water bath, dried, and pelletized.

Prior to extrusion, all samples were pre-blended on a 10 liter HENSCHEL™ high intensity mixer for 1 minute. Before introducing the samples into the extruder, the extruder was purged with 5 kg of a commercial non-nucleated 1.8 MFR polypropylene homopolymer.

Following the 5 kg purge, a 1 kg nucleated "contamination" batch was extruded into strands that were subsequently water-cooled and chopped into pellets. This batch consisted of PRO-FAX™ 6301 homopolymer with the following additive package: IRGANOX™ 1010—500 ppm, IRGAFOS™ 168—1000 ppm, DHT-4A—400 ppm, and HPN-20E—400 ppm.

The extruded pellets from the "contamination" batch were molded into discs having a thickness of 1.27 mm with a Carver Press exerting a hydraulic pressure of 13,000 psi and a temperature of 230° C. Specimens were taken from these discs for differential scanning calorimetry.

Immediately following the "contamination" batch, a compound was extruded for 90 minutes that consisted of PRO-FAX™ 6301 homopolymer and the following additive package: IRGANOX™ 1010-500 ppm, IRGAFOS™ 168-1000 ppm, and sodium stearate—500 ppm forming Example 7.

Extruded pellet samples were collected after 1, 15, 30, 45, 60, 75, and 90 minutes. The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature (To).

The steps in Example Set 2 were repeated with the exception that calcium stearate was substituted for sodium stearate forming Example 6. The steps in Example Set 2 were repeated with the exception that DHT-4A (a synthetic hydrotalcite) was substituted for sodium stearate forming Example 5.

As seen from FIG. 1, the $T_c$ of the formulation of Example 7 (containing the sodium stearate) drops almost immediately to baseline of the polypropylene (107.5° C.) and is 5-8° C. lower than Examples 5 and 6 that contained the commonly used acid neutralizers, DHT-4A and calcium stearate. For the remaining 89 minutes of the test, Example 5 (DHT-4A)

appeared to plateau around 115° C. while only a modest reduction was observed in Example 6 (CaSt). Examples 5 and 6 typify the problem of ridding an extrusion system of nucleator to enable truly non-nucleated crystallization values to be attained. On the other hand, by a mechanism which is not fully understood, the sodium stearate (Example 7) apparently deactivates the residual amounts of the HPN-20E remaining in the system.

Example Set 3

Some polypropylene extrusion systems first extrude a polypropylene with a nucleating agent (in an amount greater than 50 ppm), then switch over to a non-nucleated grade polypropylene. The non-nucleated grade polypropylene may still contain residual amounts (1 ppm) of nucleating agent. This example simulates the non-nucleated grade polypropylene with residual amounts of various commercially available nucleating agents and the effects of various preferred acid scavengers on the $T_c$ of the polypropylene composition.

To create polypropylene compositions having low levels of nucleating agents, a concentrated nucleating agent mixture was first formed by adding the following ingredients to PRO-FAX™ 6301 12 MFR PP homopolymer reactor flake: IRGANOX™ 1010 in an amount of 500 ppm, IRGAFOS™ 168 in an amount of 1000 ppm, and nucleator (either FLUID ENERGY™ sodium benzoate, ASAHI DENKA™ NA-11, ASAHI DENKA™ NA-21, ASAHI DENKA™ NA-71, GCH aluminum p-tertiary butyl benzoic acid (also known as Al-PTBBA and also bis(4-tert-butyl-benzoate) aluminum hydroxide), IMERYS™ Jetfine 3CA talc, or SIGMA ALDRICH™ lithium benzoate) in an amount of 1000 ppm. Utilizing a 0.5 kg batch size, these ingredients were high intensity blended in a 4 liter Henschel mixer for 1 minute forming the concentrated nucleating agent mixture.

Next, to PRO-FAX™ 6301 12 MFR PP homopolymer reactor flake, the following ingredients were added: IRGANOX™1010 in an amount of 500 ppm, IRGAFOS™168 in an amount of 1000 ppm, and the concentrated nucleating agent mixture in an amount of 1000 ppm. This serial dilution resulted in 1 ppm nucleating agent in the formulation. In addition, the acid scavenger to be screened was also added at a concentration consistent with its use in commercial formulations. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a MADDOCKS™ mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature ($T_c$)

TABLE 2

Nucleating agent loading, acid scavenger loading, and peak $T_c$ of Examples 8-28.

| | Nucleator Loading | Potassium Stearate Loading | Sodium Stearate Loading | Aluminum Stearate Loading | Peak Tc (° C.) |
|---|---|---|---|---|---|
| Example 8 | Sodium Benzoate 1 ppm | 500 ppm | — | — | 105.8 |
| Example 9 | Sodium Benzoate 1 ppm | — | 500 ppm | — | 107.0 |
| Example 10 | Sodium Benzoate 1 ppm | — | — | 500 ppm | 106.0 |
| Example 11 | Asahi Denka NA-11 1 ppm | 500 ppm | — | — | 106.0 |
| Example 12 | Asahi Denka NA-11 1 ppm | — | 500 ppm | — | 112.3 |
| Example 13 | Asahi Denka NA-11 1 ppm | — | — | 500 ppm | 105.8 |
| Example 14 | Asahi Denka NA-21 1 ppm | 500 ppm | — | — | 104.7 |
| Example 15 | Asahi Denka NA-21 1 ppm | — | 500 ppm | — | 108.0 |
| Example 16 | Asahi Denka NA-21 1 ppm | — | — | 500 ppm | 105.8 |
| Example 17 | Asahi Denka NA-71 1 ppm | 500 ppm | — | — | 104.8 |
| Example 18 | Asahi Denka NA-71 1 ppm | — | 500 ppm | — | 109.3 |
| Example 19 | Asahi Denka NA-71 1 ppm | — | — | 500 ppm | 105.3 |
| Example 20 | Aluminum p-tertiary butyl benzoic acid 1 ppm | 500 ppm | — | — | 104.5 |
| Example 21 | Aluminum p-tertiary butyl benzoic acid 1 ppm | — | 500 ppm | — | 106.3 |
| Example 22 | Aluminum p-tertiary butyl benzoic acid 1 ppm | — | — | 500 ppm | 105.7 |
| Example 23 | Talc 1 ppm | 500 ppm | — | — | 108.2 |
| Example 24 | Talc 1 ppm | — | 500 ppm | — | 109.0 |
| Example 25 | Talc 1 ppm | — | — | 500 ppm | 107.8 |
| Example 26 | Lithium Benzoate 1 ppm | 500 ppm | — | — | 105.3 |
| Example 27 | Lithium Benzoate 1 ppm | — | 500 ppm | — | 107.0 |
| Example 28 | Lithium Benzoate 1 ppm | — | — | 500 ppm | 104.5 |

Reviewing Examples 8-28, each Example when used in conjunction with residual amounts of various nucleators resulted in imparted $T_c$ values that were either below baseline or no more than about 5° C. above baseline. Examples 8-11 and 13-28 when used in conjunction with residual amounts of various nucleators resulted in an imparted $T_c$ values that were either below baseline or no more than about 2° C. above baseline. Therefore, it appears that the preferred stearates would have broad applicability for use in non-nucleated polypropylene where baseline $T_c$ performance is desired.

Example Set 4

Some polypropylene extrusion systems first extrude a polypropylene with a nucleating agent (in an amount greater than 50 ppm), then switch over to a non-nucleated grade polypropylene. The non-nucleated grade polypropylene may still contain residual amounts (1 ppm) of nucleating agent. This example simulates the non-nucleated grade polypropylene with residual amounts of HPN-20E and the effects of various acid scavengers from the class comprising metallic salts of stearic acid.

To create the polypropylene compositions having low levels of HPN-20E nucleating agent, a concentrated nucleating agent mixture was first formed by adding the following ingredients to PRO-FAX™ 6301 12 MFR PP homopolymer reactor flake: IRGANOX™ 1010 in an amount of 500 ppm, IRGAFOS™ 168 in an amount of 1000 ppm, and HPN-20E nucleator in an amount of 1000 ppm. Utilizing a 0.5 kg batch size, these ingredients were high intensity blended in a 4 liter HENSCHEL™ mixer for 1 minute forming the concentrated HPN-20E nucleating agent mixture.

Next, to PRO-FAX™6301 12 MFR PP homopolymer reactor flake, the following ingredients were added: IRGANOX™1010 in an amount of 500 ppm, IRGAFOS™168 in an amount of 1000 ppm, and the concentrated nucleating agent mixture in an amount of 1000 ppm. This serial dilution resulted in 1 ppm of HPN-20E nucleating agent in the formulation. In addition, the acid scavenger to be screened was also added at a concentration consistent with its use in commercial formulations. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a MADDOCKS™ mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature ($T_c$).

TABLE 3

Nucleating agent loading, acid scavenger loading, and peak $T_c$ for Examples 29-48

| | Nucleator Loading | Acid Neutralizer Loading | Peak $T_c$ (° C.) |
|---|---|---|---|
| Example 29 | HPN-20E 1 ppm | Li Stearate 500 ppm | 110.7 |
| Example 30 | HPN-20E 1 ppm | Na Stearate 500 ppm | 111.0 |
| Example 31 | HPN-20E 1 ppm | K Stearate 500 ppm | 107.6 |
| Example 32 | HPN-20E 1 ppm | Mg Stearate 500 ppm | 115.3 |
| Example 33 | HPN-20E 1 ppm | Ca Stearate 500 ppm | 116.2 |
| Example 34 | HPN-20E 1 ppm | Mn Stearate 500 ppm | 115.7 |
| Example 35 | HPN-20E 1 ppm | Co Stearate 500 ppm | 116.7 |
| Example 36 | HPN-20E 1 ppm | Cu Stearate 500 ppm | 117.3 |
| Example 37 | HPN-20E 1 ppm | Zn Stearate 500 ppm | 116.7 |
| Example 38 | HPN-20E 1 ppm | Ba Stearate 500 ppm | 116.8 |
| Example 39 | HPN-20E 1 ppm | Al Stearate 500 ppm | 115.3 |
| Example 40 | HPN-20E 1 ppm | La Stearate 500 ppm | 116.5 |
| Example 41 | HPN-20E 1 ppm | Li 12-hydroxy stearate 500 ppm | 116.8 |
| Example 42 | HPN-20E 1 ppm | Mg 12-hydroxy stearate 500 ppm | 112.8 |
| Example 43 | HPN-20E 1 ppm | Ca 12-hydroxy stearate 500 ppm | 117.0 |
| Example 44 | HPN-20E 1 ppm | Zn 12-hydroxy stearate 500 ppm | 114.7 |
| Example 45 | HPN-20E 1 ppm | Ca Stearoyl Lactylate (Pationic 930) | 116.3 |
| Example 46 | HPN-20E 1 ppm | Ca Stearoyl Lactylate overbased with Ca(OH)$_2$ (Pationic 940) | 117.7 |
| Example 47 | HPN-20E 1 ppm | Ca Lactate (Pationic 1230) | 116.5 |
| Example 48 | HPN-20E 1 ppm | Ca Lactate overbased with Ca(OH)$_2$ (Pationic 1240) | 117.5 |

In general, the monovalent metal salts of stearic acid (examples 29-31) produced the lowest peak crystallization temperatures when used in conjunction with residual amounts of HPN-20E, imparting $T_c$ values that were within about 3.5° C. above the baseline. Among these types, the potassium stearate provided the lowest Tc response. In this Example Set, no significant differences in the above examples were apparent between the divalent and trivalent salts that were tested.

Example Set 5

Some polypropylene extrusion systems first extrude a polypropylene with a nucleating agent (in an amount greater than 50 ppm), then switch over to a non-nucleated grade polypropylene. The non-nucleated grade polypropylene may still contain residual amounts (1 ppm) of nucleating agent. This example simulates the non-nucleated grade polypropylene with residual amounts of HPN-68L and the effects of various acid scavengers from the class comprising metallic fatty acid salts.

To create the polypropylene compositions having low levels of HPN-68L nucleating agent, a concentrated nucleating agent mixture was first formed by adding the following ingredients to PRO-FAX™ 6301 12 MFR PP homopolymer reactor flake: IRGANOX™ 1010 in an amount of 500 ppm, IRGAFOS™ 168 in an amount of 1000 ppm, and HPN-68L nucleator in an amount of 1000 ppm. Utilizing a 0.5 kg batch size, these ingredients were high intensity blended in a 4 liter HENSCHEL™ mixer for 1 minute forming the concentrated HPN-68L nucleating agent mixture.

Next, to PRO-FAX™ 6301 12 MFR PP homopolymer reactor flake, the following ingredients were added: IRGANOX™1010 in an amount of 500 ppm, IRGAFOS™168 in an amount of 1000 ppm, and the concentrated nucleating agent mixture in an amount of 1000 ppm. This serial dilution resulted in 1 ppm of HPN-68L nucleating agent in the formulation. In addition, the acid scavenger to be screened was also added at a concentration consistent with its use in commercial formulations. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a MADDOCKS™ mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature (To).

TABLE 4

Nucleating agent loading, acid scavenger loading, and peak $T_c$ of Examples 49-68.

| | Nucleator Loading | Acid Neutralizer Loading | Peak $T_c$ (° C.) |
|---|---|---|---|
| Example 49 | HPN-68L 1 ppm | Li Stearate 500 ppm | 117.3 |
| Example 50 | HPN-68L 1 ppm | Na Stearate 500 ppm | 117.6 |
| Example 51 | HPN-68L 1 ppm | K Stearate 500 ppm | 109.5 |
| Example 52 | HPN-68L 1 ppm | Mg Stearate 500 ppm | 111.5 |
| Example 53 | HPN-68L 1 ppm | Ca Stearate 500 ppm | 117.2 |
| Example 54 | HPN-68L 1 ppm | Mn Stearate 500 ppm | 110.2 |
| Example 55 | HPN-68L 1 ppm | Co Stearate 500 ppm | 113.5 |
| Example 56 | HPN-68L 1 ppm | Cu Stearate 500 ppm | 114.3 |
| Example 57 | HPN-68L 1 ppm | Zn Stearate 500 ppm | 111.3 |
| Example 58 | HPN-68L 1 ppm | Ba Stearate 500 ppm | 116.2 |
| Example 59 | HPN-68L 1 ppm | Al Stearate 500 ppm | 109.0 |
| Example 60 | HPN-68L 1 ppm | La Stearate 500 ppm | 113.2 |
| Example 61 | HPN-68L 1 ppm | Li 12-hydroxy stearate 500 ppm | 116.8 |
| Example 62 | HPN-68L 1 ppm | Mg 12-hydroxy stearate 500 ppm | 107.5 |
| Example 63 | HPN-68L 1 ppm | Ca 12-hydroxy stearate 500 ppm | 117.2 |
| Example 64 | HPN-68L 1 ppm | Zn 12-hydroxy stearate 500 ppm | 108.0 |
| Example 65 | HPN-68L 1 ppm | Ca Stearoyl Lactylate (Pationic 930) 500 ppm | 109.2 |
| Example 66 | HPN-68L 1 ppm | Ca Stearoyl Lactylate overbased with Ca(OH)$_2$ (Pationic 940) 500 ppm | 117.8 |
| Example 67 | HPN-68L 1 ppm | Ca Lactate (Pationic 1230) 500 ppm | 115.0 |
| Example 68 | HPN-68L 1 ppm | Ca Lactate overbased with Ca(OH)$_2$ (Pationic 1240) 500 ppm | 116.3 |

No correlation appeared to exist between the valency of the metallic stearate and peak crystallization temperature when the salt was used in conjunction with residual amounts of Hyperform HPN-68L. In fact low $T_c$ values were observed with the monovalent potassium salt (example 51); divalent magnesium, manganese, and zinc salts (examples 52, 54, 57 respectively); and the trivalent aluminum salt (example 59). All of these previously mentioned salts imparted $T_c$ values that were within about 3.8° C. above baseline.

Potassium stearate (examples 31 and 51) provides a low Tc response with either HPN-68L or HPN-20E and is preferred. With respect to the 12-hydroxy stearates (examples 61-64), the magnesium and zinc salts provided Tc values within about 0.5° C. above baseline.

With respect to the calcium lactates and lactylates (examples 65-68), none provided the desirable low peak crystallization temperature in the presence of residual amounts of HPN-68L nucleator except for the calcium stearoyl lactylate (Pationic 930). This acid neutralizer is the only Ca salt that has provided a low crystallization temperature in the presence of either HPN-20E or HPN-68L.

Except for potassium stearate, all of the stearates tested seem to have differing responses when used with residual amounts of HPN-68L versus HPN-20E with respect to the peak crystallization temperature of the PP composition.

Example Set 6

Some polypropylene extrusion systems first extrude a polypropylene with a nucleating agent (in an amount greater than 50 ppm), then switch over to a non-nucleated grade polypropylene. The non-nucleated grade polypropylene may still contain residual amounts (1 ppm) of nucleating agent. This example simulates the non-nucleated grade polypropylene with residual amounts of HPN-20E and the effects of various inorganic additives and acid scavengers.

To create the polypropylene compositions having low levels of HPN-20E nucleating agent, a concentrated nucleating agent mixture was first formed by adding the following ingredients to PRO-FAX™ 6301 12 MFR PP homopolymer reactor flake: IRGANOX™ 1010 in an amount of 500 ppm, IRGAFOS™ 168 in an amount of 1000 ppm, and HPN-20E nucleator in an amount of 1000 ppm. Utilizing a 0.5 kg batch size, these ingredients were high intensity blended in a 4 liter HENSCHEL™ mixer for 1 minute forming the concentrated HPN-20E nucleating agent mixture.

Next, to PRO-FAX™ 6301 12 MFR PP homopolymer reactor flake, the following ingredients were added: IRGANOX™1010 in an amount of 500 ppm, IRGAFOS™168 in an amount of 1000 ppm, and the concentrated nucleating agent mixture in an amount of 1000 ppm. This serial dilution resulted in 1 ppm of HPN-20E nucleating agent in the formulation. In addition, the inorganic additives and acid scavengers to be screened were all added at a concentration of 1000 ppm. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a MADDOCKS™ mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature (To).

TABLE 5

Nucleating agent loading, additive/acid scavenger loading, and peak $T_c$ of Examples 69-78.

| | Nucleator Loading | Inorganic Additive/Acid Neutralizer Loading | Peak $T_c$ (° C.) |
|---|---|---|---|
| Example 69 | HPN-20E 1 ppm | Magnesium oxysulfate - 1000 ppm (Milliken Hyperform HPR-803i) | 115.7 |
| Example 70 | HPN-20E 1 ppm | Magnesium Oxide - 1000 ppm (Sigma Aldrich) | 117.2 |

TABLE 5-continued

Nucleating agent loading, additive/acid scavenger loading, and peak $T_c$ of Examples 69-78.

| | Nucleator Loading | Inorganic Additive/Acid Neutralizer Loading | Peak $T_c$ (° C.) |
|---|---|---|---|
| Example 71 | HPN-20E 1 ppm | Magnesium Dihydroxide - 1000 ppm (Huber Vertex 60HST) | 116.5 |
| Example 72 | HPN-20E 1 ppm | Calcium Oxide - 1000 ppm (Polycal OS325) | 118.2 |
| Example 73 | HPN-20E 1 ppm | USP Zinc Oxide - 1000 ppm (ZCA USP) | 117.2 |
| Example 74 | HPN-20E 1 ppm | Titanium dioxide - 1000 ppm (TR-23) | 114.3 |
| Example 75 | HPN-20E 1 ppm | Calcium carbonate - 1000 ppm (Imerys Supercoat) | 116.3 |
| Example 76 | HPN-20E 1 ppm | Calcium Silicate - 1000 ppm (NYCO Nyglos 8) | 114.0 |
| Example 77 | HPN-20E 1 ppm | Silica - 1000 ppm (WR Grace Perkasil SM660) | 113.2 |
| Example 78 | HPN-20E 1 ppm | Synthetic Hydrotalcite - 1000 ppm (Kyowa DHT-4A) | 118.4 |

As can be seen in Table 5, some inorganic additives are also effective at reducing the $T_c$ in the presence of residual amounts of the HPN-20E nucleator. Some of the higher performers (i.e., titanium dioxide, calcium silicate, and silica, examples 74, 76, and 77 respectively) were 5.7-6.8° C. above the polypropylene baseline crystallization temperature.

Example Set 7

Some polypropylene extrusion systems first extrude a polypropylene with a nucleating agent (in an amount greater than 50 ppm), then switch over to a non-nucleated grade polypropylene. The non-nucleated grade polypropylene may still contain residual amounts (1 ppm) of nucleating agent. This example simulates the non-nucleated grade polypropylene with residual amounts of HPN-68L and the effects of various inorganic additives and acid scavengers.

To create the polypropylene compositions having low levels of HPN-68L nucleating agent, a concentrated nucleating agent mixture was first formed by adding the following ingredients to PRO-FAX™ 6301 12 MFR PP homopolymer reactor flake: IRGANOX™ 1010 in an amount of 500 ppm, IRGAFOS™ 168 in an amount of 1000 ppm, and HPN-68L nucleator in an amount of 1000 ppm. Utilizing a 0.5 kg batch size, these ingredients were high intensity blended in a 4 liter HENSCHEL™ mixer for 1 minute forming the concentrated HPN-68L nucleating agent mixture.

Next, to PRO-FAX™ 6301 12 MFR PP homopolymer reactor flake, the following ingredients were added: IRGANOX™ 1010 in an amount of 500 ppm, IRGAFOS™ 168 in an amount of 1000 ppm, and the concentrated nucleating agent mixture in an amount of 1000 ppm. This serial dilution resulted in 1 ppm of HPN-68L nucleating agent in the formulation. In addition, the inorganic additives and acid scavengers to be screened were all added at a concentration of 1000 ppm. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a Maddocks mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature (To).

TABLE 6

Nucleating agent loading, additive/acid scavenger loading, and peak $T_c$ in Examples 79-88.

| | Nucleator Loading | Inorganic Additive/Acid Neutralizer Loading | Peak $T_c$ (° C.) |
|---|---|---|---|
| Example 79 | HPN-68L 1 ppm | Magnesium oxysulfate - 1000 ppm (Milliken Hyperform HPR-803i) | 112.2 |
| Example 80 | HPN-68L 1 ppm | Magnesium Oxide - 1000 ppm (Sigma Aldrich) | 114.7 |
| Example 81 | HPN-68L 1 ppm | Magnesium Dihydroxide - 1000 ppm (Huber Vertex 60HST) | 113.7 |
| Example 82 | HPN-68L 1 ppm | Calcium Oxide - 1000 ppm (Polycal OS325) | 116.0 |
| Example 83 | HPN-68L 1 ppm | USP Zinc Oxide - 1000 ppm (ZCA USP) | 114.2 |
| Example 84 | HPN-68L 1 ppm | Titanium dioxide - 1000 ppm (TR-23) | 110.2 |
| Example 85 | HPN-68L 1 ppm | Calcium carbonate - 1000 ppm (Imerys Supercoat) | 113.7 |
| Example 86 | HPN-68L 1 ppm | Calcium Silicate - 1000 ppm (NYCO Nyglos 8) | 108.8 |
| Example 87 | HPN-68L 1 ppm | Silica - 1000 ppm (WR Grace Perkasil SM660) | 111.8 |
| Example 88 | HPN-68L 1 ppm | Synthetic Hydrotalcite - 1000 ppm (Kyowa DHT-4A) | 119.5 |

In the presence of residual amounts of HPN-68L nucleator, calcium silicate (example 86) and titanium dioxide (example 84) strongly reduce the peak crystallization value. In these cases, both were within about 2.7° C. above the polypropylene baseline crystallization temperature. Similarly, magnesium oxysulfate (example 79) and silica (example 87) were found to provide suppressed peak crystallization values that were within about 4.7° C. above the polypropylene baseline crystallization temperature.

Example Set 8

Previous studies have shown that potassium stearate imparts a preferred low peak crystallization value in the presence of residual amounts of both HPN-20E and HPN-68L. On the other hand, calcium stearate consistently imparted an undesirably high peak crystallization value in the presence of residual amounts of both HPN-20E and HPN-68L. This study was undertaken to understand if the carbon chain length would affect the behavior of either the potassium or calcium fatty acid salt.

To create the polypropylene compositions having low levels of Hyperform HPN-68L nucleating agent, a concentrated nucleating agent mixture was first formed by adding the following ingredients to PRO-FAX™ 6301 12 MFR PP homopolymer reactor flake: IRGANOX™ 1010 in an amount of 500 ppm, IRGAFOS™ 168 in an amount of 1000 ppm, and HPN-68L nucleator in an amount of 1000 ppm. Utilizing a 0.5 kg batch size, these ingredients were high intensity blended in a 4 liter HENSCHEL™ mixer for 1 minute forming the concentrated HPN-68L nucleating agent mixture.

Next, to PRO-FAX™ 6301 12 MFR PP homopolymer reactor flake, the following ingredients were added: IRGANOX™ 1010 in an amount of 500 ppm, IRGAFOS™ 168 in an amount of 1000 ppm, and the concentrated nucleating agent mixture in an amount of either 500 ppm or 1000 ppm. In addition, the acid scavenger to be screened was also added at a concentration consistent with its use in commercial formulations. This serial dilution resulted in either 0.5 ppm or 1 ppm of HPN-68L nucleating agent in the formulation. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a MADDOCKS™ mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature (To).

TABLE 7

Nucleating agent loading, acid scavenger loading, and peak $T_c$ of Examples 89-104.

| | Nucleator Loading | Acid Neutralizer Loading | Peak $T_c$ (° C.) |
|---|---|---|---|
| Example 89 | HPN-68L 0.5 ppm | Calcium Propionate ($C_3$) 500 ppm | 115.7 |
| Example 90 | HPN-68L 0.5 ppm | Calcium Octanoate ($C_8$) 500 ppm | 114.8 |
| Example 91 | HPN-68L 0.5 ppm | Calcium Caprate ($C_{10}$) 500 ppm | 115.0 |
| Example 92 | HPN-68L 1 ppm | Calcium Myristate ($C_{14}$) 500 ppm | 117.3 |
| Example 93 | HPN-68L 0.5 ppm | Calcium Pentadecanoate ($C_{15}$) 500 ppm | 115.3 |
| Example 94 | HPN-68L 0.5 ppm | Calcium Heptadecanoate ($C_{17}$) 500 ppm | 116.2 |
| Example 95 | HPN-68L 0.5 ppm | Calcium Stearate ($C_{18}$) 500 ppm | 116.5 |
| Example 96 | HPN-68L 1 ppm | Calcium Stearate ($C_{18}$) 500 ppm | 117.2 |
| Example 97 | HPN-68L 0.5 ppm | Calcium Nonadecanoate ($C_{19}$) 500 ppm | 116.5 |
| Example 98 | HPN-68L 1 ppm | Calcium Behenate ($C_{22}$) 500 ppm | 118.2 |
| Example 99 | HPN-68L 0.5 ppm | Potassium Propionate ($C_3$) 500 ppm | 112.7 |
| Example 100 | HPN-68L 0.5 ppm | Potassium Octanoate ($C_8$) 500 ppm | 109.8 |
| Example 101 | HPN-68L 0.5 ppm | Potassium Caprate ($C_{10}$) 500 ppm | 110.7 |
| Example 102 | HPN-68L 1 ppm | Potassium Myristate ($C_{14}$) 500 ppm | 109.0 |
| Example 103 | HPN-68L 0.5 ppm | Potassium Stearate ($C_{18}$) 500 ppm | 110.2 |
| Example 104 | HPN-68L 1 ppm | Potassium Stearate ($C_{18}$) 500 ppm | 109.5 |

The composite peak crystallization value for the calcium salts (Examples 89-98) was 116.3° C.+/−1.1° C. while the composite peak crystallization value for the potassium salts (Examples 99-104) was 110.3° C.+/−1.3° C.

These data indicate that the carbon chain length does not have a very significant effect with respect to the acid neutralizer's ability to subdue residual nucleation. On the other hand the metal associated with fatty acid salt appears to be the most significant factor with regard to the acid neutralizer's ability to provide the desired low crystallization temperature of the polypropylene composition.

Example Set 9

All of the previous studies illustrated how certain acid neutralizers can provide desired low or baseline crystallization temperatures in polypropylene systems containing residual amounts of nucleator of 1 ppm and less. This experiment evaluates how potassium stearate affects nucleation in PP systems having nucleator concentrations of 10 ppm all the way up to conventional usage loadings of 500 ppm and 1000 ppm. Comparisons were also made to similarly nucleated systems containing calcium stearate rather than potassium stearate.

To create the polypropylene compositions containing various levels of HPN-68L nucleating agent, a concentrated nucleating agent mixture was first formed by adding the following ingredients to PRO-FAX™ 6301 12 MFR PP homopolymer reactor flake: IRGANOX™ 1010 in an amount of 500 ppm, IRGAFOS™ 168 in an amount of 1000 ppm, and HPN-68L nucleator in an amount of 1000 ppm. Utilizing a 0.5 kg batch size, these ingredients were high intensity blended in a 4 liter HENSCHEL™ mixer for 1 minute forming the concentrated HPN-68L nucleating agent mixture.

Next, to PRO-FAX™ 6301 12 MFR PP homopolymer reactor flake, the following ingredients were added: IRGANOX™ 1010 in an amount of 500 ppm, IRGAFOS™ 168 in an amount of 1000 ppm, and the concentrated nucleating agent mixture in amounts ranging from 0.1% to 100%. In addition, the acid scavenger to be screened was also added at a concentration consistent with its use in commercial formulations. This serial dilution resulted in final concentrations ranging from 1 to 1000 ppm of HPN-68L nucleating agent in the formulation. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a MADDOCKS™ mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature (To).

TABLE 8

Nucleating agent loading, acid scavenger loading, and peak $T_c$ of Examples 105-115

| | Nucleator Loading | Acid Neutralizer Loading | Peak $T_c$ (° C.) |
|---|---|---|---|
| Example 105 | HPN-68L 1 ppm | Potassium Stearate 500 ppm | 109.5 |
| Example 106 | HPN-68L 10 ppm | Potassium Stearate 500 ppm | 115.3 |
| Example 107 | HPN-68L 50 ppm | Potassium Stearate 500 ppm | 118.3 |
| Example 108 | HPN-68L 100 ppm | Potassium Stearate 500 ppm | 120.3 |
| Example 109 | HPN-68L 250 ppm | Potassium Stearate 500 ppm | 122.5 |

TABLE 8-continued

Nucleating agent loading, acid scavenger loading, and peak $T_c$ of Examples 105-115

| | Nucleator Loading | Acid Neutralizer Loading | Peak $T_c$ (° C.) |
|---|---|---|---|
| Example 110 | HPN-68L 500 ppm | Potassium Stearate 500 ppm | 124.8 |
| Example 111 | HPN-68L 1 ppm | Calcium Stearate 500 ppm | 117.2 |
| Example 112 | HPN-68L 10 ppm | Calcium Stearate 500 ppm | 120.7 |
| Example 113 | HPN-68L 250 ppm | Calcium Stearate 400 ppm | 125.0 |
| Example 114 | HPN-68L 500 ppm | Calcium Stearate 400 ppm | 127.3 |
| Example 115 | HPN-68L 1000 ppm | Calcium Stearate 500 ppm | 129.0 |

The preceding table illustrates again the effect of potassium stearate and calcium stearate on the polymer $T_c$ at various nucleator loadings.

At low nucleator levels, potassium stearate provides $T_c$ values near those from baseline polymer. As the amount of nucleator is increased, it begins to outcompete this suppressive effect and can effectively perform as a nucleating agent. While the $T_c$ is never as high as with calcium stearate, this may provide a useful process in manufacturing to simplify material supply or cleanout.

Example Set 10

Previous studies evaluated fatty acid salts at a typical commercial loading of around 500 ppm to understand their interaction with residual amounts of nucleator. This experiment seeks to determine if the desired low crystallization temperature can be enhanced by using higher loadings of the acid scavenger.

To create polypropylene compositions having low levels of nucleating agents, a concentrated nucleating agent mixture was first formed by adding the following ingredients to PRO-FAX™ 6301 12 MFR PP homopolymer reactor flake: IRGANOX™ 1010 in an amount of approximately 500 ppm, IRGAFOS™ 168 in an amount of 1000 ppm, and nucleator (either HPN-68L or HPN-20E) in an amount of 1000 ppm. Utilizing a 1 kg batch size, these ingredients were high intensity blended in a 10 liter HENSCHEL™ mixer for 1 minute forming the concentrated nucleating agent mixture.

Next, to PRO-FAX™ 6301 12 MFR PP homopolymer reactor flake the following ingredients were added: IRGANOX™ 1010 in an amount of 500 ppm, IRGAFOS™ 168 in an amount of 1000 ppm, and the concentrated nucleating agent mixture in an amount of 1000 ppm. This serial dilution resulted in 1 ppm nucleating agent in the formulation. In addition, the acid scavenger to be screened was also added at a concentration consistent with its use in commercial formulations and then also at a significantly higher loading. Utilizing a 0.5 kg batch size, these ingredients were high intensity blended in a 4 liter HENSCHEL™ mixer for 1 minute.

The diluted formulations were then compounded on a DELTAPLAST™ extruder (typical output of approximately 6 kg/hr) having a 25 mm single screw with an L/D ratio of 30:1 and equipped with a MADDOCKS™ mixer. The barrel temperature profile was set with a maximum zone setting of approximately 230° C. The molten polymer was filtered through a 60 mesh screen pack and then extruded through a strand die. The strand was subsequently quenched in a water bath, dried, and pelletized.

The extruded pellets were molded into discs having a thickness of 1.27 mm with a Carver Press exerting a hydraulic pressure of 13,000 psi and a temperature of 230° C. Specimens were taken from these discs for differential scanning calorimetry to determine the peak crystallization temperature ($T_c$).

TABLE 9

Nucleating agent loading, acid scavenger loading, and peak $T_c$ of Examples 116-135.

| | Nucleator Loading | Acid Neutralizer Loading | Peak $T_c$ (° C.) |
|---|---|---|---|
| Example 116 | HPN-20E 1 ppm | Potassium Stearate 500 ppm | 107.6 |
| Example 117 | HPN-20E 1 ppm | Potassium Stearate 2000 ppm | 108.0 |
| Example 118 | HPN-20E 1 ppm | Sodium Stearate 500 ppm | 111.0 |
| Example 119 | HPN-20E 1 ppm | Sodium Stearate 2000 ppm | 111.5 |
| Example 120 | HPN-20E 1 ppm | Aluminum Stearate 500 ppm | 115.3 |
| Example 121 | HPN-20E 1 ppm | Aluminum Stearate 2000 ppm | 114.2 |
| Example 122 | HPN-20E 1 ppm | Magnesium Stearate 500 ppm | 115.3 |
| Example 123 | HPN-20E 1 ppm | Magnesium Stearate 2000 ppm | 113.0 |
| Example 124 | HPN-20E 1 ppm | Ca Stearoyl Lactylate (Pationic 930) 500 ppm | 116.3 |
| Example 125 | HPN-20E 1 ppm | Ca Stearoyl Lactylate (Pationic 930) 1000 ppm | 115.3 |
| Example 126 | HPN-68L 1 ppm | Potassium Stearate 500 ppm | 109.5 |
| Example 127 | HPN-68L 1 ppm | Potassium Stearate 2000 ppm | 111.5 |
| Example 128 | HPN-68L 1 ppm | Sodium Stearate 500 ppm | 117.6 |
| Example 129 | HPN-68L 1 ppm | Sodium Stearate 2000 ppm | 118.7 |
| Example 130 | HPN-68L 1 ppm | Aluminum Stearate 500 ppm | 109.0 |
| Example 131 | HPN-68L 1 ppm | Aluminum Stearate 2000 ppm | 109.8 |
| Example 132 | HPN-68L 1 ppm | Magnesium Stearate 500 ppm | 111.5 |
| Example 133 | HPN-68L 1 ppm | Magnesium Stearate 2000 ppm | 107.2 |
| Example 134 | HPN-68L 1 ppm | Ca Stearoyl Lactylate (Pationic 930) 500 ppm | 109.2 |
| Example 135 | HPN-68L 1 ppm | Ca Stearoyl Lactylate (Pationic 930) 1000 ppm | 111.8 |

Moving to higher loadings of acid scavenger did not appear to significantly affect the interaction of the fatty acid salt with the residual amount of either HPN-68L or HPN-20E nucleator except for magnesium stearate. In this case (examples 122, 123, 132, and 133), moving from 500 ppm to 2000 ppm lowered the $T_c$ by 2.3° C. and 4.3° C. in the presence of 1 ppm HPN-20E and 1 ppm HPN-68L respectively.

Apart from magnesium stearate, there was no consistent upward or downward trend identified with how higher loadings of the other fatty acid salts affected the crystallization temperature of the polypropylene composition.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A process for extruding polypropylene comprising, in order:
   a. extruding a first composition through a first extruder forming a first extrudate, wherein the first composition comprises first reactor flake polypropylene, a nucleating agent, and a first acid scavenger, wherein the nucleating agent is in an amount of at least about 50 ppm;
   b. extruding a second composition through the first extruder following step a. forming a second extrudate, wherein the second composition comprises second reactor flake polypropylene and a second acid scavenger, wherein the second acid scavenger is a potassium salt of a fatty acid, wherein the second extrudate contains between about 0.01 ppm and 1 ppm of the nucleating agent, and wherein the content of all nucleating agents in the second extrudate is less than 10 ppm.

2. The process of claim 1, wherein the first acid scavenger is selected from the group consisting of calcium stearate and hydrotalcite.

3. The process of claim 1, wherein the first acid scavenger and the second acid scavenger are the same composition.

4. The process of claim 1, wherein the nucleating agent comprises a cycloaliphatic metal salt.

5. The process of claim 1, wherein the nucleating agent comprises at least one metal salt conforming to the structure of Formula (I)

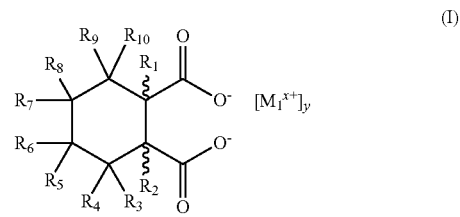

where $M_1$ is an organic or inorganic cation, x is an integer from 1 to 2, and y is 1 or 2, wherein $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_9$ alkyl, hydroxy, $C_1$-$C_9$ alkoxy, $C_1$-$C_9$ alkyleneoxy, amine, $C_1$-$C_9$ alkylamine, halogen, and phenyl, wherein if such groups are alkyl, any two vicinal or geminal alkyl groups may be combined to form a carbocyclic ring of up to six carbon atoms, and wherein the carboxyl moieties of Formula (I) are present in cis configuration.

6. The process of claim 5, wherein $R_1$-$R_{10}$ are hydrogen and $M_1$ is a calcium cation.

7. The process of claim 1, wherein the nucleating agent comprises a bicyclic compound conforming with the structure of Formula (II)

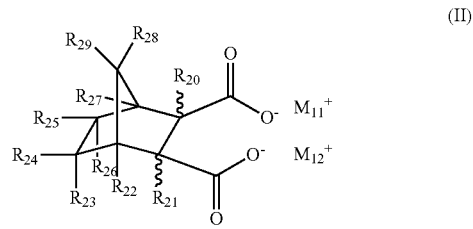

wherein $M_{11}$ and $M_{12}$ are the same or different, or $M_{11}$ and $M_{12}$ are combined to form a single moiety, and are independently selected from the group consisting of metal or organic cations, wherein $R_{20}$, $R_{21}$, $R_{22}$, $R_{23}$, $R_{24}$, $R_{25}$, $R_{26}$, $R_{27}$, $R_{28}$, and $R_{29}$ are independently selected from the group consisting of: hydrogen and $C_1$-$C_9$ alkyls, and further wherein any two adjacently positioned $R_{22}$-$R_{29}$ alkyl groups optionally may be combined to form a carbocyclic ring.

8. The process of claim 7, wherein $R_{20}$-$R_{29}$ are hydrogen and $M_{11}$ and $M_{12}$ are sodium cations.

9. The process of claim 1, wherein the first composition comprises the nucleating agent in an amount of at least about 100 ppm.

10. The process of claim 1, wherein the second acid scavenger comprises a potassium cation and a $C_3$-$C_{22}$ fatty acid anion.

11. The process of claim 1, wherein the second acid scavenger comprises potassium stearate.

12. The process of claim 1, wherein the difference between the $T_c$ of the first extrudate and the second extrudate is greater than approximately 5° C.

13. A process for extruding polypropylene comprising, in order:

a. extruding a first composition through a first extruder forming a first extrudate, wherein the first composition comprises first reactor flake polypropylene, a first nucleating agent, and a first acid scavenger, wherein the first nucleating agent is in an amount of at least about 50 ppm, and wherein the first extrudate has a first $T_c$;

b. extruding a second composition through the first extruder following step a. forming a second extrudate having a second $T_c$, wherein the second composition comprises second reactor flake polypropylene having a baseline $T_c$ and a second acid scavenger, wherein the second acid scavenger is a potassium salt of a fatty acid, wherein the second extrudate contains between about 0.01 ppm and 1 ppm of the first nucleating agent, wherein the content of all nucleating agents in the second extrudate is less than 10 ppm, wherein the difference between the second $T_c$ and the baseline $T_c$ is less than about 5° C., and wherein the difference between the second $T_c$ and the first $T_c$ is at least about 10° C.

14. The process of claim 13, wherein the first acid scavenger is selected from the group consisting of calcium stearate and hydrotalcite.

15. The process of claim 13, wherein the first acid scavenger and the second acid scavenger are the same composition.

16. The process of claim 13, wherein the first nucleating agent comprises a cycloaliphatic metal salt.

17. The process of claim 13, wherein the first nucleating agent comprises at least one metal salt conforming to the structure of Formula (I)

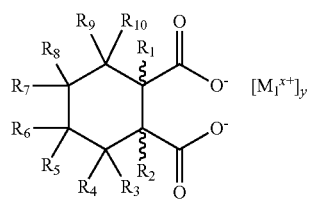

(I)

where $M_1$ is an organic or inorganic cation, x is an integer from 1 to 2, and y is 1 or 2, wherein $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_9$ alkyl, hydroxy, $C_1$-$C_9$ alkoxy, $C_1$-$C_9$ alkyleneoxy, amine, $C_1$-$C_9$ alkylamine, halogen, and phenyl, wherein if such groups are alkyl, any two vicinal or geminal alkyl groups may be combined to form a carbocyclic ring of up to six carbon atoms, and wherein the carboxyl moieties of Formula (I) are present in cis configuration.

18. The process of claim 13, wherein the first nucleating agent comprises a bicyclic compound conforming with the structure of Formula (II)

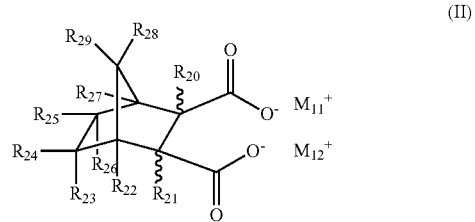

(II)

wherein $M_{11}$ and $M_{12}$ are the same or different, or $M_{11}$ and $M_{12}$ are combined to form a single moiety, and are independently selected from the group consisting of metal or organic cations, wherein $R_{20}$, $R_{21}$, $R_{22}$, $R_{23}$, $R_{24}$, $R_{25}$, $R_{26}$, $R_{27}$, $R_{28}$, and $R_{29}$ are independently selected from the group consisting of: hydrogen and $C_1$-$C_9$ alkyls, and further wherein any two adjacently positioned $R_{22}$-$R_{29}$ alkyl groups optionally may be combined to form a carbocyclic ring.

19. The process of claim 13, wherein the first composition comprises the first nucleating agent in an amount of at least about 100 ppm.

20. The process of claim 13, wherein the second acid scavenger comprises potassium stearate.

\* \* \* \* \*